Figure 1:
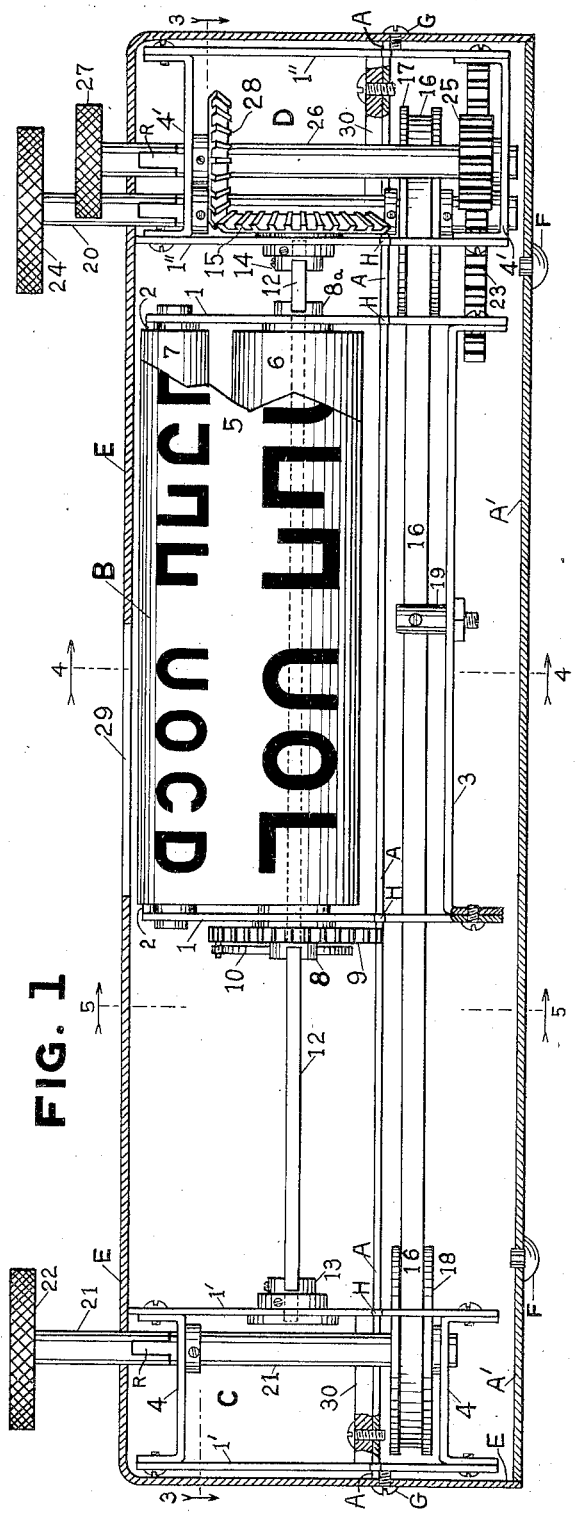

March 10, 1936.  O. W. LEE  2,033,529
VISUAL ACUITY METER
Filed Oct. 6, 1933  4 Sheets-Sheet 1

INVENTOR
Orval W. Lee

March 10, 1936.  O. W. LEE  2,033,529
VISUAL ACUITY METER
Filed Oct. 6, 1933  4 Sheets-Sheet 3

INVENTOR
Orval W. Lee

Patented Mar. 10, 1936

2,033,529

UNITED STATES PATENT OFFICE 2,033,529

VISUAL ACUITY METER

Orval W. Lee, Spokane, Wash.

Application October 6, 1933, Serial No. 692,416

20 Claims. (Cl. 40—95)

My present invention relates to an improved visual acuity meter or ophthalmic test-media display device of the laterally selective and rotary selective type for use by oculists and optometrists for measuring the vision of the human eye, correcting errors of refraction and for various ophthalmic purposes. In carrying out my invention I provide an optical appliance that has a multiple capacity for two or more columns of visual acuity characters or test-media, selectively, upon a movable screen wound around paired rollers, whereby both the required length of the screen and the required rotation of the rollers is greatly lessened and this multiple capacity and selectivity is attained by the compact arrangement of a laterally movable carriage upon a track and the carriage is driven both rotary and laterally by mechanical units rigid with the track at extreme opposite ends.

Means are provided for both major and minor regulation of the rotative selectivity and the combination and arrangement of the parts of the appliance affords the required adjustments enabling each of the various sections of the movable screen to be brought to view before an observation aperture, quickly and easily. Due to the novel construction of the appliance, either the lateral or the rotary selectivity may be adjusted independently of each other and they may also be adjusted with relation one to the other.

Due to the simplicity of construction and operation of the various parts of the appliance, the rollers and the carriage may with facility be accurately adjusted to required positions and the desired selectivity may be quickly and conveniently attained.

Means are provided to keep the screen taut upon the rollers and thereby avoid sag and irregular winding of the screen upon the rollers.

Due to the sectional construction of the rollers, a means is provided for detachably retaining the screen upon the rollers, whereby it may be removed, replaced, or renewed with ease.

The rollers are rotated in like direction by gears which are held in close contact by a compensating spring, whereby lost motion is eliminated when the direction of rotation is reversed.

The carriage and the driving units are assembled upon the track in such a manner as to preclude the possibility of the carriage leaving the track.

By the utilization of the appliance of my invention the oculist or optometrist may expeditiously employ the test-media of various selected portions of the movable screen to conduct the examination or refraction of the human eye by any desired method; the required rotation of the rollers being reduced to the extent of the number of columns of test-media upon the screen, the amount of manipulation necessary to bring a selected portion of the screen before the observation aperture is greatly reduced; the capacity of the screen being increased to the extent of the number of columns of test-media upon the screen, a greater number of selections of test-media is available without an increased length of screen; the rotation of the rollers being accomplished by either a low speed, or a high speed drive, both minor adjustments and wide excursions of the movable screen may be accomplished with a minimum amount of manipulation; by these features a greater utility is provided and less effort is required to accomplish selection, which materially adds to the convenience of the operator and materially reduces the amount of time required to conduct an examination or refraction of the human eye.

The parts of the appliance are so co-ordinated as to perform their functions properly and any skilled person can operate the appliance without difficulty.

The movable screen is provided with several series of visual acuity characters of improved form, each selection representing a percentage of normal vision. In the drawings, I illustrate the conventional Snellen characters and the improved characters described and claimed in my own patent application No. 692,107 filed Oct. 4, 1933, which matured into Patent No. 1,999,054 granted April 23, 1935.

The appliance is adapted for use either individually or it may be installed as a part of other ophthalmic furniture.

The invention consists of certain novel structures, combinations and arrangements of parts as will hereinafter be more fully set forth and claimed. It will be understood that the invention is not restricted to the exact structure herein illustrated and described, but that modifications may be made in the disclosed structure without departing from the principles of the invention and the intent of the claims. In the accompanying drawings I have illustrated one preferred example of the physical embodiment of my invention.

Figure 2:
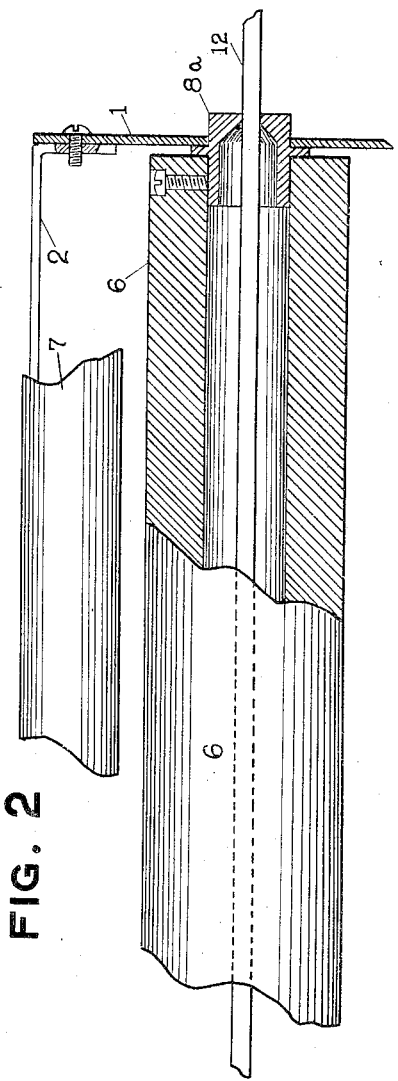
Figure 3:
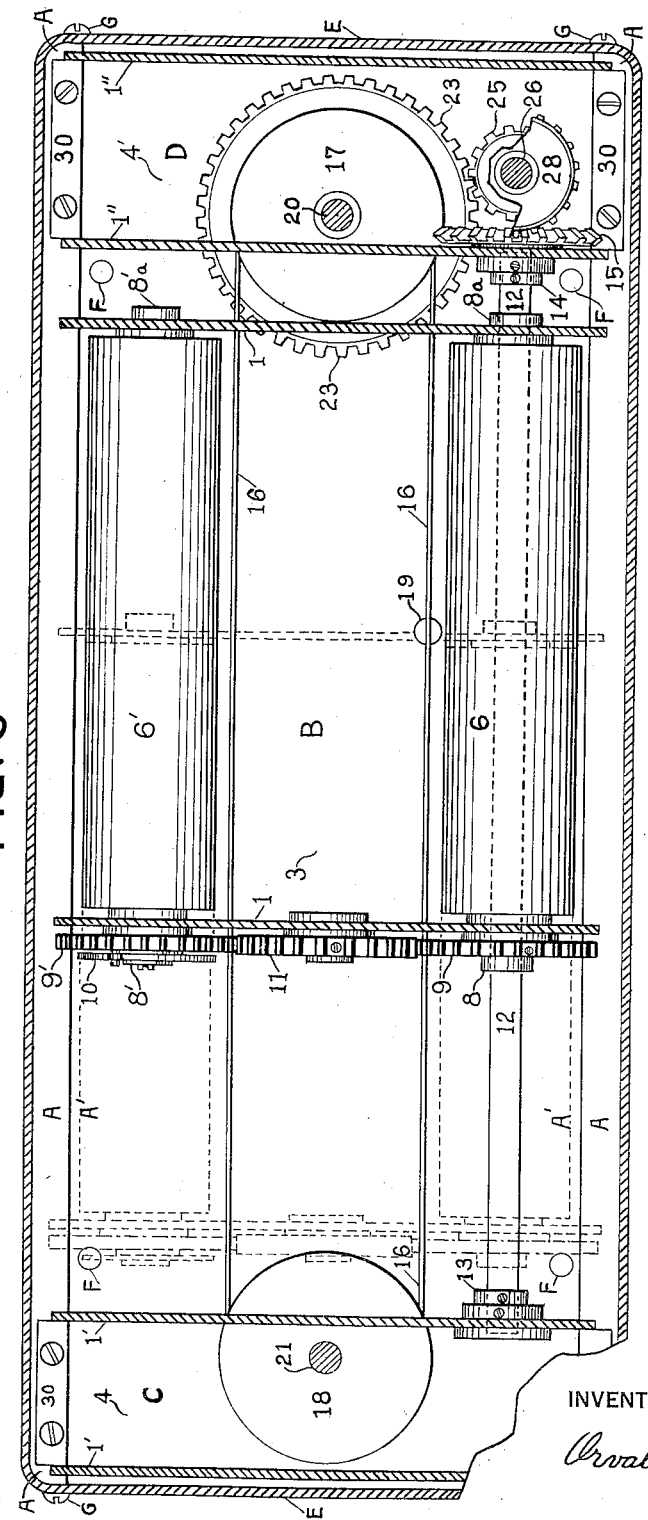
Figure 4:
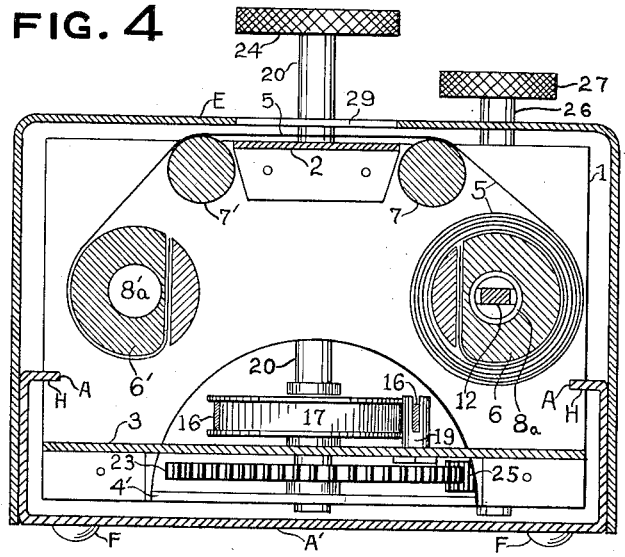
Figure 5:
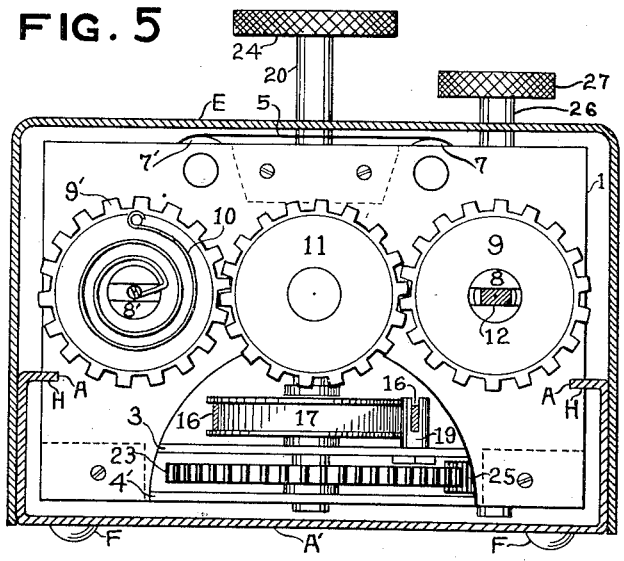
Figure 6:
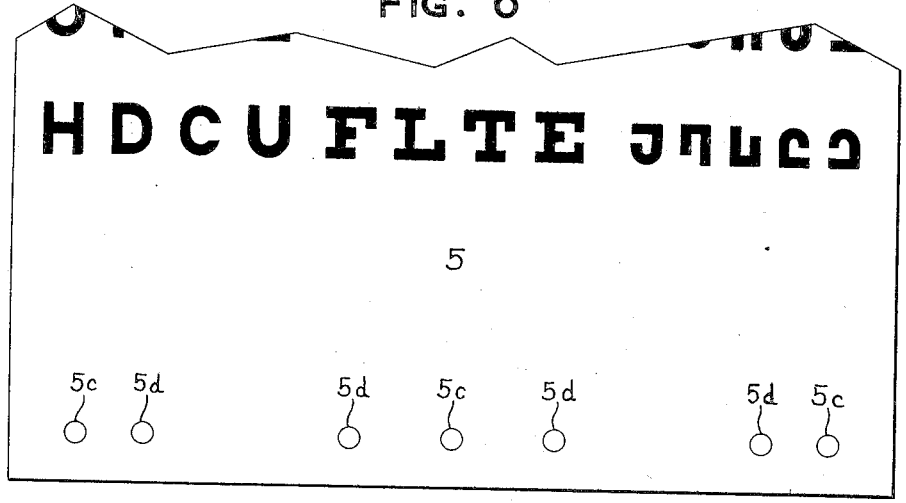
Figure 7:
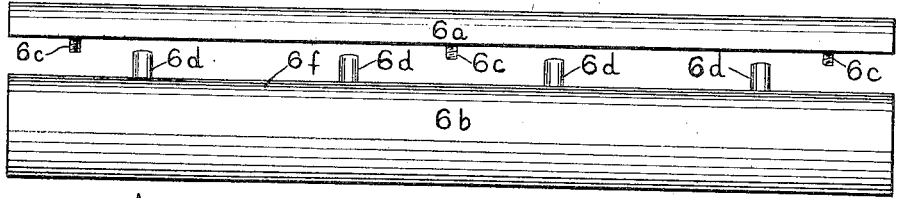
Figure 8:
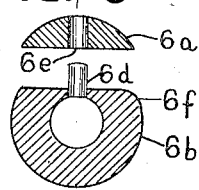
Figure 9:
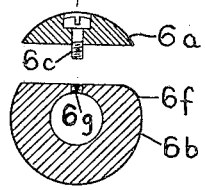
Figure 10:
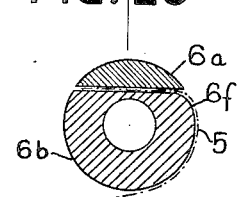

Figure 1 is a front elevation, partly in section, of an optical appliance involving the principles of my invention. Figure 2 is a detail view, partly in section, showing the relation of the winding roller, slotted bearing and flat drive shaft. Figure 3 is a plan view, partly in section, showing the winding rollers and the driving mechanisms, indicated by the line 3, 3, in Figure 1. Figure 4 is a vertical, transverse, sectional view on the line 4, 4, of Figure 1. Figure 5 is a vertical, transverse, sectional view on the line 5, 5 of Figure 1, disclosing the gears of the winding rollers and the compensating spring. Figure 6 is a detail view of one end of the movable screen disclosing the means of attachment to the winding rollers. Figure 7 is an elevation of a disassembled winding roller disclosing the means of securing the screen between the sections of the roller. Figures 8 and 9 are sectional views of Figure 7 at the point indicated. Figure 10 is a sectional view of the winding roller when assembled, the movable screen being indicated by the broken line.

In carrying out my invention, as a part of the equipment I may employ a case E and provide non-metallic supporting knobs F, F, on the under surface of the track base to provide a portable appliance; or the case and supporting knobs may be dispensed with and the appliance secured to a support within other ophthalmic furniture. The case E if used, may be secured to the base by any appropriate means as for instance the screws G, threaded into the opposite ends of the case and engaging below the inwardly extending ends of the track.

The appliance consists of a track A, A, supporting a laterally movable carriage B situated intermediate two laterally spaced driving mechanisms C and D, that are rigid with the track A, A. The track is of sufficient length and the driving units are spaced at sufficient distance apart to afford the required movements of the carriage necessary to position any column of test-media upon the screen in alignment with a centrally located observation aperture 29. The track is designed as an integral part of the base and supports the entire mechanism, no working part being secured to the case. As seen in Figure 4 the track A, A, and base A' are fashioned from a single piece, the base extending upward at right angles on opposite sides and then extending inward at right angles to form a parallel track running full length and parallel with the base. As seen in Figures 4 and 5 the end-frames of the movable carriage are provided with notches H, H, one on each of the opposite edges, spaced at sufficient distance from the bottom of the frame to lift the carriage free from the base when on the track. The end-frames of the driving units C and D are also provided with similar notches to provide a means of alignment on the track. It will be apparent that these parts are so constructed that the laterally movable carriage B, the lateral drive unit C and the rotary drive unit D may readily be assembled on the track in proper alignment as shown in Figure 1, and they may be dismantled with equal facility when required for any reason. The driving mechanisms C and D are rigidly secured in their positions at the extreme opposite ends of the track by any suitable means as for instance the flat blocks 30 placed between the end-frames on opposite sides of each driving unit and anchored by screws threaded into the track.

The control knobs 22, 24, 27 for the driving mechanisms extend an appropriate distance through the surface containing the observation aperture and are easily accessible to the operator. As shown at R in Figure 1, these knobs are detachable, to facilitate removal of the case and to adapt the appliance to installation in other ophthalmic furniture. The case or the adjacent structure of the ophthalmic furniture in which the device is installed is provided with a centrally located rectangular aperture 29 of sufficient dimensions to afford a view of a selected full line of any one of the two or more columns of test-media upon the movable screen 5.

The frames of each of the units B, C and D consists of upright end-plates 1, 1, 1', 1', 1'', 1'', rigidly secured to upper and lower horizontal plates 2, 3, 4, 4, 4', 4', and the mechanism of these units is journaled in these frame plates.

The laterally movable carriage B, carries the test-media upon the screen 5 wound upon a pair of spaced rollers 6 and 6' and the screen passes over a pair of spaced guide-rollers 7, 7'. As best seen in Figures 5 and 3 the ends of the rollers 6, 6', are provided with slotted bearings 8, 8a, 8', 8'a, the journaled ends of these slotted bearings extend through the upright end-plates of the frame in which they are journaled. The extension of the slotted bearing 8 is provided with a gear 9 rigid with the bearing and the extension of the slotted bearing 8' is provided with a like gear 9' which is free to turn upon the bearing. The bearing 8' is connected to the gear 9' by the spring 10 and the gears 9 and 9' mesh with the intermediate gear 11. The flat-drive-shaft 12 passes through the slotted bearings 8, 8a, in the opposite ends of the roller 6 that is hollow. One end of the drive-shaft is supported in the slotted bearing 13 that is journaled in the end-plate of the lateral drive unit C and the other end is supported in the slotted bearing 14 that is attached to the hub of the drive-gear 15 that is journaled in the end-plate of the rotary drive unit D and both ends of the drive-shaft are secured by setscrews. It will be apparent that the drive-gear 15 may be employed to turn the shaft 12 and that the roller 6 and its slotted bearings 8, 8a, will turn with the shaft 12 and due to the gears 9, 9', 11, the rollers 6 and 6' will be made to rotate in like direction one to the other. The shaft 12 supports no weight and as seen in Figure 2, the shaft is in contact with the laterally movable carriage only at the internal bearing surfaces of the slotted ends of the journaled bearings of the roller 6. Sufficient clearance is allowed between the flat sides of the shaft and the internal bearing surfaces of these slots to assure freedom of lateral movements and the bearing surface upon the shaft is reduced to such an extent that the lateral movements are accompanied with but little friction. The movable carriage is driven laterally by a belt 16 that passes around two flanged pulleys 17 and 18 and is secured to an upright post 19 attached to the lower frame-plate 3. The pulley 17 is free to turn upon the shaft 20 and the pulley 18 is rigid with the shaft 21 that can be turned by the control knob 22 and it will be apparent that lateral movement of the carriage may be accomplished independent of the rotation of the winding rollers. As best seen in Figures 1 and 3, the rotation of the winding rollers is accomplished by means of the drive unit D that consists of a system of gears; the driving gear 23 is rigid with the shaft 20 that can be turned by a control knob 24, a pinion 25 is rigid with the shaft 26 that can be turned by a control knob 27, the pinion 25 turns with the driving gear 23 and an intermediate gear 28 which co-acts with the drive-gear 15 that is attached to the drive-shaft 12 in the manner previously described. It will be apparent that the rollers 6 and 6' may be rotated by means of either of these control knobs and that minor adjustments of the position of a desired portion of the screen 5 before the observation aperture 29 may be attained by turning the knob 27; it will also be apparent that wide excursions of the screen 5 upon the rollers 6, 6', may be attained by turning the knob 24. It will be evident that, rotation of the rollers may be accomplished irrespective of the lateral position of the movable carriage B and that by turning control knob 22 the carriage may be moved upon the track A, A, without disturbing the rotary adjusted position of the screen 5 upon the rollers. This latter mentioned feature may be utilized when a faltering patient fails to correctly name a certain character in a columnar line of the test-media; in which case the carriage may be adjusted laterally to a position where the character in question will either be the first or last character in the columnar line and the patient requested to name such character. It will be obvious that this procedure eliminates the uncertainty which might otherwise result from error or misunderstanding were the patient requested to name such character when situated intermediate to the two extremities of the columnar line; it also eliminates pointing with the finger or otherwise to designate a certain character and the consequent soiling or marring of the test-media.

As seen in Figure 2 the upper horizontal frame-plate 2 is placed in close proximity to the screen 5 to safeguard the screen from puncture should any object accidentally come in contact with the the screen. The purpose of the guide-rollers 7, 7', is to maintain the test-media in a constant plane and in close proximity to the observation aperture 29. It will be obvious that as the screen unwinds from one roller and winds around the other that the diameter of the wound screen upon each roller is constantly changing and that due to the dissimilar diameters of one roll to the other, a constant plane and close proximity to the observation aperture 29 could not be attained by placing the winding rollers 6 and 6' in the location of the guide-rollers 7, 7' and dispensing with the latter. It will be obvious that the previously mentioned variation in the diameters of the winding screen cause variations in the rate at which the screen is delivered from one roller to the other. This rate variation is compensated by the use of the spring 10, the inner end of said spring is secured in the slot in the end of bearing 8' which is attached to the roller 6' and the outer end is secured to a pin on the gear 9' that is free to turn upon the bearing 8' of the roller 6'. It will be evident that when the screen winding around the roller 6 becomes of greater diameter than the portion unwinding from roller 6' that the screen will pull upon the roller 6' causing it to turn at a faster rate than the rotation effected by the coacting gears of the rollers, which will cause the bearing 8' to turn in the gear 9' and wind the spring 10. Conversely, when the screen is unwound from its greater diameter upon the roller 6, the spring will unwind and turn the roller 6' at a faster rate than the rotation effected by the coacting gears of the rollers and thereby keep the screen taut at all times. It may be mentioned that this tautness tends to make the screen wind evenly without bias shifting, and due to the absence of slack, buckling of the screen in avoided. It will be apparent that the compensating spring performs its functions irrespective of changes in the direction of winding. It will also be apparent that the spring 10 serves the three-fold purpose of maintaining the screen taut, compensating for the variation in winding rate, and keeping the gear teeth in close one-way contact.

As seen in Figures 7 and 8 the winding rollers 6 and 6' are sectional; the segment 6a is detachably secured to the section 6b by means of a number of spaced counter sunk screws 6c. The segment 6a is provided with a number of spaced holes 6e and the section 6b carries an equal number of similarly spaced complementary short projecting pins 6d; as seen in Figure 6 the end of the movable screen 5 is provided with an equal number of similarly spaced complementary perforations 5d and the screen 5 is also provided with a number of additional perforations 5c complementary to the screws 6c shown in Figures 7 and 9 and of course similarly spaced. It will be apparent that the segment 6a can quickly and easily be detached, the perforations 5d in the end of the movable screen 5 fitted over the complementary projecting pins 6d in the winding roller and secured in position by fitting the complementary holes 6e over the projecting pins 6d; the sections 6a and 6b may then be secured to each other by means of the screws 6c that pass through the complementary perforations 5c in the screen 5 and are threaded into the holes 6g, thereby securely holding the screen in proper alignment between the two sections of the winding roller. The section 6b is rounded at the point 6f to prevent creasing and tearing of the screen 5. The improved construction enables an unskilled person to quickly and easily mount the screen in proper alignment upon the winding rollers, which is important for even winding and parallel position of the test-media with relation to the observation aperture.

The appliance shown in Figure 1 is designed for use with an optical device utilizing the principles of multiple reflection, as for instance the ophthalmic deflector described in my own patent application 676,454 which matured into Patent No. 2,003,806 granted June 4, 1935. For this reason the test-media are presented on the horizontal plane to be reflected from a mirror spaced vertically above, to a horizontally spaced observation mirror. For this purpose the letters should be placed as shown and as dual reflection does not produce a reverse image, the test-media need not be reversed. Direct observation and single reflection require presenting the test-media on a vertical plane and for this purpose the necessary changes are made in the arrangement of the parts so that the track will be horizontally disposed and the observation aperture vertically disposed.

By the use of the appliance of my invention the oculist or optometrist has at his immediate command a liberal selection of test-media of several kinds, sizes and selections. Each selection is separately displayed and no unrelated characters are visible to confuse the patent. The examiner can utilize the test-media of the different columns alternately at will. The required adjustments can be quickly and easily accomplished without undue manipulation of the controls and a liberal variety of test-media are available in a minimum of time. The multiple columns of the screen afford a multiple capacity of test-media and the screen can be removed, replaced or changed quickly and easily, thereby permitting of the use of several different screens if desired. The device is light, compact, efficient and requires no attention other than its operation. Being designed for use upon a horizontal plane it is adaptable to an optical appliance producing a vertical image of horizontally disposed test-media and its control knobs are readily accessible when the appliance is installed in such a device; these features are advantages not attainable in other test-media display devices obtainable at the present time.

In the invention herein disclosed, what I claim as new and desire to secure by Letters Patent of the United States is:

1. The combination in an appliance for displaying ophthalmic test-media, of a pair of spaced winding rollers and a pair of spaced guide rollers journaled in a frame, means for rotating the winding rollers and means for laterally moving the rollers and the frame.

2. The combination in an appliance having ophthalmic test-media wound upon rollers, of a laterally movable carriage, a lateral drive mechanism and a rotary drive mechanism, manually operated controls for said mechanisms, whereby selection of the test-media is accomplished.

3. An appliance having ophthalmic test-media upon a movable screen wound upon rollers and positioned before an observation aperture by auxiliary guide-rollers, means to turn said winding rollers, thereby moving said screen over said guide-rollers and presenting selected test-media to view before said observation aperture; means to automatically compensate for inequalities of the winding rate, whereby said screen is maintained taut; and means to laterally move said screen, rollers and guide rollers.

4. In an appliance having ophthalmic test-media wound upon rollers, the combination of a driving gear, a control knob for said driving gear, a pinion gear engaged with said driving gear, a control knob for said pinion gear, a drive gear, a gear train between said pinion gear and drive gear, a drive shaft rigid with said drive gear, engaging means between said shaft and one roller, coacting means to rotate the other roller, whereby one of said control knobs may be used to turn the rollers slowly and the other to turn the rollers rapidly.

5. An appliance for optical use having a laterally movable carriage, a lateral drive mechanism and a rotary drive mechanism, aligned upon a track, rollers upon the carriage, test-media wound upon the rollers, a shaft slidably interlocked with one roller, means for turning said shaft and roller, co-acting means for turning the other roller; and means whereby the carriage is moved upon the track independent of the rotation of said shaft.

6. An appliance for optical use having a laterally movable carriage, a lateral drive mechanism, and a rotary drive mechanism, supported upon a track, the laterally movable carriage having a screen wound upon a pair of rollers, bearing supports for the rollers, a drive-shaft slidably fitted through one of said rollers, bearing supports for the drive-shaft, means for turning the shaft, engaging means between the roller and the shaft, whereby the roller turns with the shaft and coacting means for rotating the other roller, means for moving the carriage upon the track and slidably upon said rotary drive shaft, independent of the rotation of the latter.

7. An appliance for optical use having a one-piece track and base, a carriage movable upon the track, rollers upon the carriage, test-media upon the rollers, a lateral drive mechanism and a rotary drive mechanism, all parts detachably mounted upon said track, a removable case enclosing the device, means for attaching the case to the track-base, an observation aperture in the case, detachable control knobs extending through the wall of the case for optional use with the case or through any other surface to which the device may be adapted and means for adjusting the test-media with relation to the observation aperture.

8. An appliance for optical use having a laterally movable carriage, a pair of sectional rollers journaled on the carriage, a screen detachably secured between the sections of the rollers, multiple columns of test-media upon the screen, guide rollers for maintaining the plane of the screen, a protective plate for preventing punctures of the screen, a base having a parallel track, guides upon the carriage, means for engaging the guides upon the track, an inclosing case, means for securing the case to the track base, an observation aperture in the case or covering, means for moving the carriage upon the track, whereby, the different columns of test-media are aligned with the observation aperture, means for simultaneously winding the screen from one roller upon the other roller, means for equalizing the winding rate, means for keeping the screen taut, means to accomplish minor rotation of the rollers and means to accomplish major rotation of the rollers; whereby any selected portion of the multiple columns of test-media may quickly and easily be presented to the observation aperture.

9. The combination in an appliance displaying ophthalmic test-media, of a pair of winding rollers journaled in a frame, guides on said frame, a track, said guides slidable upon said track, manually operated means for turning the rollers and manually operated means for slidably adjusting the position of the rollers upon the track.

10. An appliance for optical use, comprising a track, winding rollers journaled in a frame, guides on said frame slidably interlocked with said track, drive units rigidly secured at the opposite ends of said track, a shaft journaled in the frames of said drive units and slidably interlocked with one of said winding rollers, gear connections between said shaft and a second shaft journaled in one of said drive units, a pulley free upon said second shaft, a second pulley rigid with a third shaft journaled in the other drive unit, a cable trained around said pulleys and secured to said slidable frame, whereby the latter may be slidably adjusted upon said track and the first shaft aforesaid by turning the third shaft aforesaid, and whereby turning said second shaft will rotate said first shaft and the roller interlocked therewith, independent of the slidable adjustment of the latter, and whereby slidable adjustment of the latter may be accomplished independent of the rotation thereof.

11. An appliance for optical use, comprising a track, a carriage slidable upon said track, a pulley disposed at each end of said track, a cable passed around said pulleys, the free ends of said cable attached to said carriage, whereby rotation of said pulleys will slidably adjust the position of said carriage longitudinally of said track, rollers journaled upon said carriage and means for turning the rollers as required.

12. An appliance for optical use, comprising a pair of spaced pulleys, winding rollers disposed between said pulleys, a cable trained around said pulleys and adapted to move said rollers longitudinally, in either direction alternately as desired, by the rotation of said pulleys, and means to turn said rollers as required.

13. In an appliance for optical use, having a roller provided with means for attaching material to be wound thereon, the combination of a shaft slidable through said roller, engaging means between said shaft and roller, bearing supports for the shaft, means to turn the shaft and thereby rotate the roller; and means to slidably adjust the roller upon the shaft, independent of the rotation of the latter.

14. An appliance for optical use having a laterally movable carriage, the carriage having a pair of hollow winding rollers, a screen wound upon the rollers, test-media upon the screen, the winding rollers having bored and slotted journal bearings, a flat drive-shaft slidable in the internal bearing surfaces of the slotted bearings of one roller, means for turning the shaft and co-acting means to rotate both rollers and means for moving the carriage laterally.

15. In an appliance for optical use having a roller slidable upon a flat shaft, the combination of an open journal bearing having a reduced internal bearing surface embodying a partially bored journal bearing having a slot in the unbored end thereof, said slot being of sufficient depth to communicate with said bore and admit said flat shaft, whereby the shaft has clearance in the bore and a reduced bearing surface on the internal bearing surfaces of said slot, and whereby the shaft is slidable within the bearing with but little friction and whereby the bearing will turn with the shaft.

16. An appliance for optical use having test-media upon a screen wound upon segmented rollers, the major portion of each roller being pivotably mounted and the segment portion being detachable, means for detachably securing said screen therebetween, means to turn the rollers and thereby accomplish selection of the test-media.

17. An appliance for optical use, including a sectional roller for detachably engaging the free end of a strip of material to be wound thereon; said roller comprising two sections, one section having a number of spaced projections, the other having an equal number of complementary holes, complementary perforations in the free end of said strip of material for engaging said projections, means for securing the two sections of said roller together when the perforated material is engaged with said projections, a well rounded edge at the point where the material emerges from between said sections, whereby creasing of the material is prevented; and means for rotatably mounting the roller.

18. An appliance for optical use having a movable screen wound upon a pair of sectional rollers, each roller having two sections, the one section having a number of spaced holes, the other section having an equal number of equally spaced complementary, short, projecting pins; co-acting means upon the two sections for securing them together and complementary perforations on each end of the screen for detachably mounting each end between the sections of each roller, means to wind the screen upon one roller and unwind it from the other roller alternately as desired.

19. An appliance for optical use having test-media upon a movable screen, a pair of sectional rollers, means for detachably securing the opposite ends of the screen between the sections of the rollers, bearing supports for the rollers, means to turn the rollers thereby winding the screen upon one roller and simultaneously unwinding it from the other roller and means for moving the rollers longitudinally.

20. An appliance for optical use having a longitudinally and transversely movable screen, multiple columns of test-media upon the movable screen and means for selectively presenting any desired portion of the multiple columns before a fixed observation aperture.

ORVAL W. LEE.